United States Patent
Weitsman et al.

Patent Number: 5,340,625
Date of Patent: Aug. 23, 1994

[54] LAYOUT AND MANUFACTURING METHOD FOR FIBER-REINFORCED COMPOSITE SHELLS

[76] Inventors: Y. Jack Weitsman, 2616 Dalemere Dr., Knoxville, Tenn. 37923; Edward N. Kuznetsov, 2009 Burlison Dr., Urbana, Ill. 61801

[21] Appl. No.: 944,540

[22] Filed: Nov. 16, 1992

[51] Int. Cl.$^5$ .............................................. B29D 23/00
[52] U.S. Cl. ........................................ 428/36.3; 87/7; 87/8; 428/36.1; 428/273; 428/417
[58] Field of Search .................... 428/225, 34.5, 34.7, 428/36.1, 273, 417, 36.3; 87/7, 8

[56] References Cited

U.S. PATENT DOCUMENTS

| | | | |
|---|---|---|---|
| 4,946,721 | 8/1990 | Kinderwater et al. | 428/36.1 |
| 4,946,722 | 8/1990 | Moyer | 428/36.1 |
| 5,122,400 | 6/1992 | Stewart | 428/36.1 |
| 5,186,992 | 2/1993 | Hite | 428/36.1 |
| 5,242,743 | 9/1993 | Nakanishi et al. | 428/34.5 |
| 5,300,337 | 4/1994 | Andrew et al. | 428/36.1 |

*Primary Examiner*—James J. Bell

[57] ABSTRACT

A layout and manufacturing method for fiber-reinforced, laminated composite shells utilizes as a reinforcement a nested assembly of braided sleeves. The original sleeve diameters are selected individually such that, upon being deformed into the final shape, the fibers acquire angular orientations prescribed by the shell design. Shells of desired shapes are obtained either by pulling the sleeves on a rigid mandrel or, alternately, by statically deforming the nested sleeve assembly, thereby eliminating the use of mandrels. The statical means involve proper combinations of tensile edge forces and surface loads exerted, e.g., by a pressurized bladder or by spinning the assembly. In one embodiment, the sleeves are tensioned and, if necessary, vibrated prior to matrix curing so as to force the fibers to approach geodesic trajectories (isotensoid layout). By releasing the sleeve tension after curing, a favorable compressive prestress is induced in the matrix material. Tension levels in the sleeves can be designed such as to produce a compressive transverse (interlaminar) normal stress component in the matrix thereby enhancing the shell resistance to delamination. A composite shell shaped by statical means may be used as a mandrel for subsequent filament winding and remain a permanent core of the final shell.

10 Claims, 1 Drawing Sheet

LAYOUT AND MANUFACTURING METHOD FOR FIBER-REINFORCED COMPOSITE SHELLS

BACKGROUND OF THE INVENTION

This invention pertains to laminated composite shells whose surfaces are closed in the hoop direction (shapes such as a barrel-, nozzle-, or dome-like) or in both hoop and longitudinal directions (such as a pressure vessel). Composite materials technology is most advanced for essentially flat structures such as plates or shallow (slightly curved) shells and for cylindrical shells. Unidirectionally reinforced tapes or woven fabrics are used in both cases. In the construction of doubly curved shells, two main manufacturing methods are common-filament winding and laminating. Both methods generally require the utilization of mandrels, which in many circumstances need to be removed or otherwise disposed of upon completion of the manufacturing process. The disposal procedures are sometimes very cumbersome.

Filament-wound shells have a high volumetric density of fibers and implement the most efficient, isotensoid, design where the fibers are uniformly stressed. However, filament winding is a rather slow process requiring a sophisticated computer-controlled equipment to maintain a complex winding pattern with a carefully monitored fiber tension level. An inherent difficulty arises due to the high fiber overlaps and the resulting build-up of the shell thickness at the areas with a smaller radius, such as the vicinity of the shell apex.

The alternative method of construction is assembling a doubly curved shell of prepreg unidirectionally reinforced tapes or woven fabric plies on a mold or mandrel. A review of the state-of-the art manufacturing techniques of this method within the context of the resulting mechanical properties (strength, toughness) was provided by Groves (1991). The method is characterized by irregular layout patterns with extensive staggered splicing, thereby precluding an efficient utilization of the fiber strength. The method also involves a series of time-consuming and essentially manual operations. The difficulty stems from the geometric discrepancy between the doubly curved surfaces of shell structures and the geometry of flat prepreg tapes or fabrics. Although woven fabric can comply smoothly to any curvilinear surface, applying an initially flat prepreg fabric ply to a mandrel produces folds, wrinkles and air-filled voids. In their manual smoothing and rolling out, some inadvertent fiber rearrangement is unavoidable and difficult to predict or control; the process depends on such diverse factors as the shape of the surface, weave density and internal friction within the ply, interlaminar friction, viscosity of the uncured resin, and so on. The unavoidable and potentially harmful consequence of the manual smoothing is an imperfect and inconsistent prepreg lay-up geometry, in particular, fiber misalignment, waviness and microbuckling. These imperfections may be aggravated and perpetuated by the pressure applied in autoclave curing which is necessary to reduce matrix voids and to improve the volumetric density of fibers in the composite. The resulting unpredictable and randomly localized defects reduce the composite shell stiffness and strength.

The present invention is concerned with an alternative layout and manufacturing method for laminated composite shells. The objective is to obviate the above difficulties in the current state of the art and to provide some other advantages discussed below.

SUMMARY OF THE INVENTION

The key feature of a fiber-reinforced, laminated composite shell of this invention is the utilization of a nested assembly of braided sleeves, i.e., several sleeves placed one within another. Specific shapes of shells are obtainable by pulling the sleeves on a rigid mandrel and thereupon employing the common manufacturing procedures. As an alternative, it is possible to forgo the use of mandrels by applying suitable surface and edge loads to the sleeve assembly and maintaining the loads in the process of matrix curing. Tensioning a sleeve forces its fiber strands to approach geodesic trajectories and become isotensoid, provided that the strand mobility is unhampered in both the longitudinal and transverse directions. This approach presents a unique opportunity to implement a statically optimal isotensoid design without filament winding. Upon curing and unloading, the composite shell acquires a residual stress (prestress) with tension in the reinforcing fibers and compression in the matrix, which is highly beneficial for the strength, stiffness and fracture toughness of the shell. Increasing the initial tension level and extensional stiffness of the outermost sleeve of a convex shell relative to the respective parameters for the inner sleeves produces a residual state of stress with a compressive transverse (interlaminar) normal stress component which enhances the delamination resistance of the shell. The sleeve diameters, initial tension levels, elastic properties and combined cross sectional areas of fibers can be designed so as to obtain a prestress pattern that complements optimally the stress state superimposed by operational external loads.

DESCRIPTION OF PREFERRED EMBODIMENTS

Figure 1:
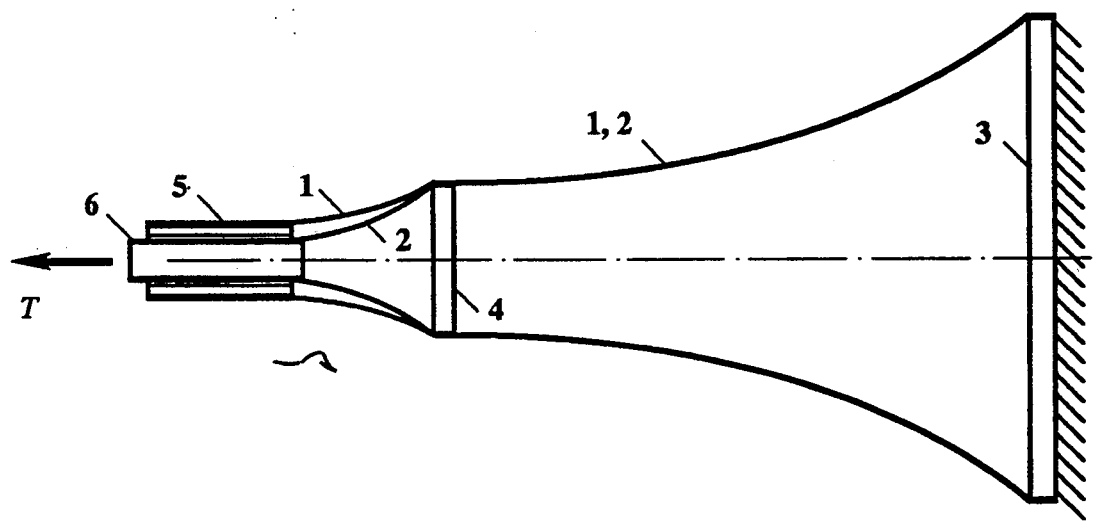

A layout and manufacturing method for laminated composite shells of this invention is related mostly to shells whose surfaces are closed in the hoop direction or in both hoop and longitudinal directions. Although the method is particularly suitable for shells of revolution, it is in no way limited to such shapes and is naturally applicable to shells of asymmetric closed shapes.

The key feature of a fiber-reinforced, laminated composite shell of this invention is the shell's reinforcement in the form of a nested assembly of braided sleeves, i.e., several sleeves placed one within another. Each of these nested sleeves is braided of flat fiber strands (called tows in the industry). A serendipitous geometric property of a braided sleeve is that it smoothly applies to (can be "dressed" on) any closed surface. For example, on a surface of revolution it forms an axisymmetric net with a variable radius and net angle; more specifically, it is the possibility of the variation in the net angle that enables the sleeve to comply to an arbitrary axisymmetric surface. A suitable combination of the nominal (i.e., original braiding) diameters of the nested sleeves can always be selected so as to implement any particular shell design. Specifically, this includes the size requirements of the shell structure and the required directional lay-up pattern of reinforcing fibers at a given location of the shell, as determined by stress analysis.

The described geometric properties suggest that a braided sleeve is as natural a building block in the construction of a closed laminated composite shell as a flat fiber-reinforced tape or woven fabric is in the construction of a laminated plate or shallow shell. For a closed shell, the crucial advantage of a nested sleeve lay-up over a conventional woven fabric lay-up is the elimination of the crippling ply splicing along with the wasteful ply overlap. Another important advantage is avoiding the most time-consuming and least repeatable manual operations inherent in the tape and woven fabric lay-up. As a result, the nested sleeve reinforcement facilitates consistency and geometric precision of laminate lay-up, thereby ensuring a higher overall quality of manufacturing.

In addition to the described favorable geometric features, the nested sleeve concept presents some unique statical advantages. A braided sleeve subjected to a surface pressure and edge tension attains a geodesic pattern and an isotensoid stress state provided that in-surface slippage of the fiber tows is unhampered in both the longitudinal and transverse directions. The geometric reconfiguration is caused by tension that forces the individual tows to shift transversely so as to approach the shortest (geodesic) trajectories on the surface; the isotensoid state is the result of a force-leveling effect of longitudinal slippage of tows. This behavior presents a unique opportunity for the attainment of a statically optimal geodesic isotensoid design without laborious filament winding. Its implementation in the laminated shell construction requires inducing sleeve tension (enhanced, when necessary, by vibration) sufficient to overcome friction and any other resistance to the tow slippage. It has been observed that the described geometric reconfiguration under tension occurs within a certain range of the net angle depending on the density of braiding. Only at the locations where the net angle is about 15 degrees away from either 0 or 90 degrees, tow jamming at the intersections prevents the above mentioned reconfiguration.

Specific shapes of shells can be attained by pulling the sleeves on a rigid mandrel. However, in many cases, the proposed method avoids altogether the use of mandrels and allows a required geometric shape to be obtained by statical means, by applying suitable surface and edge loads to the assembly of nested sleeves prior to curing. The surface loads can be realized, for example, as pneumatic pressure (by pressurizing an inflatable bladder insert); as hydrostatic pressure (by filling the bladder with a liquid); or as a centrifugal force field induced by spinning the assembly. The edge tension forces are to be exerted simultaneously but separately on each sleeve by tensioning devices through independent grips. Properly combining the surface load with the independently controlled tension forces in the sleeves gives rise to a wide variety of statically possible equilibrium shapes.

The described main features of the invention are illustrated in the schematic drawings of two preferred embodiments. FIG. 1 represents a tensioned nested sleeve assembly in the construction of a single- or multiple-layered anticlastic (nozzle-shaped) shell; for clarity, only two sleeve layers are shown. At one edge of the shell, all of the sleeves 1, 2 are fixed in one edge grip 3. At the other edge, the sleeves are passed over a spacer ring 4, that assures the compactness of the shell cross section. The free edges of the sleeves are individually attached to coaxial tubular grips 5, 6 which can be pulled on independently with different tension forces. As a result of tension applied to the sleeves, the assembly acquires a precise geometric configuration which is predetermined by an underlying statical-kinematic analysis that accounts for the geometric parameters and tension levels of the individual sleeves.

Figure 2:
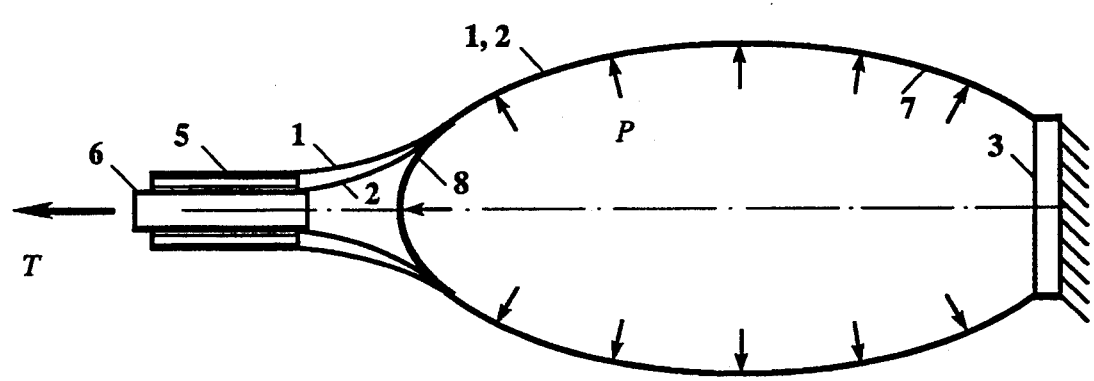

FIG. 2 shows a typical sleeve assembly for a single- or multiple-layered synclastic (convex) shell. It differs from the one in FIG. 1 in that its shape is obtained by either using a mandrel 7 or by applying a distributed surface load. The load may be produced by means such as pressurization of a flexible bladder insert 7 or a centrifugal force field induced by spinning the entire assembly about its axis. The spacer ring 3 of the previous design is replaced by a permanent cap 8 permanently incorporated into the shell structure. During construction and curing, the cap is supported by the mandrel or the pressurized bladder. If both edges of the shell must be closed, a similar cap, which may be fitted with a valve, is installed at the other edge.

The above description and depiction of the preferred embodiments serve only for illustration purposes and are not limiting the invention. For example, it is obvious that the geometric shapes of laminated shell of the described construction can be modified by using non-circular edge fixtures, intermediate braces and other localized surface constraints or indentors. If a particular shell design calls for a variable wall thickness, additional local sleeve sections can be installed which are not necessarily anchored and tensioned.

Tensioning of the sleeves, a novel feature in this invention, is advantageous for several reasons, related both to the shell manufacturing and its strength. First, sleeve tensioning leads to a more uniform engagement of the fibers by reducing or eliminating the slacks, kinks, and misalignments present in manually placed plies. Second, as a result of tension, the layout tends to become geodesic and isotensoid, thereby leading to a more efficient use of the material. Third, the sleeve tension induces a mutual contact pressure among the layers, eliminating air-filled voids and squeezing out excess resin. Although the tension, enhanced if needed by vibration, can be kept to a minimum required to attain the above three goals, some important advantages may accrue by increasing the tension level. Maintaining the sleeve tension during matrix curing and releasing it afterwards, induces in the composite shell a residual stress (prestress) with tension in the reinforcing fibers and compression in the matrix. This type of prestress is especially beneficial for high-strength and relatively more brittle matrix materials. Such a prestress considerably improves the fatigue strength, stiffness, and fracture toughness characteristics of the composite shell.

One of the inherent weaknesses of laminated composite shells is a low delamination resistance. The layout and manufacturing method of this invention provide a means to mitigate this disadvantage. Specifically, the sleeve diameters, initial tension levels, elastic properties and combined cross sectional areas of fibers can be selected such that the resulting initial stress in the cured composite shell has a compressive transverse (interlaminar) normal stress component. For example, increasing the initial tension level and extensional stiffness of the outermost sleeve of a convex shell relative to the respective parameters for the inner sleeves produces the desired type of residual stress.

Aside from improving the strength characteristics of the composite shell, it is possible to select the individual nested sleeves, their stacking sequence, and tension levels such as to obtain the most favorable prestress pattern, one that optimally complements the stress state due to operational external loads. Such a design, minimizing the weight of the composite shell, can be developed by means of currently available numerical optimization techniques.

In the manufacturing process of this invention, most manual operations are confined to the set-up stage. This includes the assembling of sleeves, attachment of the edge grips, installation of a mandrel or an inflatable bladder and, when necessary, the imposition of other shape modifiers (indentors, striction rings, etc.). Beyond the set-up stage, the actual shaping of the shell structure is achieved by mechanical rather than manual means, specifically, by tensioning the sleeves and (when applicable) by pressurizing the inflatable bladder. Thus, the manual procedures hereby eliminated are the very operations which in the conventional process are both least repeatable and potentially most harmful to the strength and stiffness of the shell.

What is claimed is:

1. A manufacturing method for fiber-reinforced composite shells that employs a reinforcement layout in the form of a nested assembly of fiber braidings (sleeves), the said sleeves being kinematically deformed into a desired surface shape and impregnated with a matrix material either before or after their installation.

2. The layout of claim 1 wherein the original diameters of said sleeves are preselected individually such that, upon deformation into the desired shape, the fibers acquire angular orientations determined by the shell design.

3. The layout of claim 1 wherein said sleeves are subjected to tension.

4. The tensioned reinforcement of claim 3 wherein tensioning of the sleeves is accompanied by vibration.

5. A composite shell with a reinforcement layout of claim 1 wherein a required geometric shape is obtained by applying suitable surface and edge loads to the sleeve assembly before matrix curing.

6. The composite shell of claim 5 wherein a surface load necessary for shaping said assembly is realized by filling and pressurizing a flexible bladder with a gas or liquid.

7. The composite shell of claim 5 wherein a surface load necessary for shaping said assembly is realized as a centrifugal force field produced by spinning the assembly.

8. A composite shell with the layout of claim 1 wherein a compressive initial stress in the cured matrix is obtained by tensioning said sleeves before curing and releasing afterwards.

9. The composite shell of claim 8 wherein the individual sleeve diameters, extensional stiffnesses and tension levels are selected such that said initial stress in the matrix has a compressive transverse (interlaminar) stress component.

10. A filament wound composite shell and a construction method thereof wherein a permanent built-in core is used as a mandrel, said core having been constructed as set forth in claim 5.

* * * * *